United States Patent [19]

Nishiki et al.

[11] Patent Number: 4,840,408
[45] Date of Patent: Jun. 20, 1989

[54] HOSE INTERMEDIATE RETAINER

[75] Inventors: Hiroyuki Nishiki, Nagoya; Yuji Kokuryu, Ichinomiya, both of Japan

[73] Assignee: Toyoda Gosei Co., Ltd., Nishikasugai, Japan

[21] Appl. No.: 107,429

[22] Filed: Oct. 13, 1987

[30] Foreign Application Priority Data

Oct. 15, 1986 [JP] Japan ............................ 61-157837[U]

[51] Int. Cl.[4] ............................................... F16L 5/00
[52] U.S. Cl. ...................................... 285/62; 285/256; 248/56
[58] Field of Search ........................ 285/256, 62, 158; 248/56

[56] References Cited

U.S. PATENT DOCUMENTS 4,674,719 6/1987 Tanioka et al. ................. 285/256 X
4,690,435 9/1987 Manning et al. ..................... 285/256

FOREIGN PATENT DOCUMENTS 2241907 3/1973 Fed. Rep. of Germany ...... 285/256
2250399 4/1973 Fed. Rep. of Germany ...... 285/256
55-15483 7/1953 Japan .
56-50893 5/1981 Japan .
62-38595 8/1987 Japan .
579395 8/1946 United Kingdom ................ 285/256

Primary Examiner—Thomas F. Callaghan
Attorney, Agent, or Firm—Cushman, Darby & Cushman

[57] ABSTRACT

A hose intermediate retainer according to the present invention comprising a hose, an intermediate retainer having an inner cylinder and an outer cylinder, and a clamp is disclosed. Among the members, the outer cylinder is the best feature of the present invention. The outer cylinder comprises a first pressed portion having a smooth surface pressed circularly in the radial direction inwardly except its both ends, and at least one second pressed portion formed on the portion of the first pressed portion and depressing the outer surface of the hose by its inner periphery surface. Since no machining operations are required to manufacture the hose intermediate retainer, the manufacturing cost is reduced, in addition the hose intermediate retainer thus manufactured exhibits an excellent tensile strength.

3 Claims, 3 Drawing Sheets

HOSE INTERMEDIATE RETAINER

BACKGROUND OF THE INVENTION

1. Field of the Invention

The present invention relates to a hose intermediate retainer retaining and fixing the intermediate portion of a hose to a mounting portion, such as a body of an automobile, via a clamp.

2. Description of the Prior Art

Several methods have been known as for retaining and fixing a hose intermediate portion to a body of an automobile and the like.

A method shown in FIG. 3 has been known, in which an inner cylinder 101 is placed in a hose 100, and an outer cylinder 102 is installed to the outer surface of the hose 100, then the outer cylinder 102 is pressed in place by crimping thereof at 2 places. Thus the hose 100 is held between the inner cylinder 101 and the outer cylinder 102, and the intermediate portion of the hose 100 is fixed to a body of an automobile by securing the outer periphery surface of the outer cylinder 102 with a clamp 110. However, the clamp 110 exerts a smaller retaining force in this method because the contacting area between the outer cylinder 102 and the clamp 110 is small due to the wave-shaped outer cylinder 102 surface.

A method shown in FIG. 4 has been known to overcome the disadvantage mentioned above, in which a whole outer cylinder 103 is crimped circularly. In this method, the clamp 110 exerts a satisfactory retaining force because the outer cylinder 103 surface is smooth. However, the tensile strength of the clamp 110 in the axial direction is poor in this method. Accordingly, the outer cylinder 103 and the hose 104 are bonded with an adhesive to add an extra tensile strength to the construction. Though, the outer cylinder 103 and the hose 104 were bonded with an adhesive, the construction exhibited the tensile strength resistible against the load of 20 and 30 kg only.

In view of the disadvantages mentioned above, a method shown in Japanese Unexamined Utility Model Publication No. 15483/1980 has been utilized. As shown in FIG. 5, the hose intermediate retainer comprises an outer cylinder 107 having a securing portion 106 with a plurality of stepped grooves formed on the outer periphery surface thereof, and an inner cylinder 109 placed in the hose 108. The outer surface of the outer cylinder 107 except the securing portion 106 is pressed in place by crimping thereof at 2 locations. Thus the hose 108 is held between the inner cylinder 109 and the outer cylinder 107, and the intermediate portion of the hose 108 is fixed to a body of an automobile by securing the clamp 110 and a stop ring 111 to the grooves of the securing portion 106.

Problems with the Prior Arts

Since the hose intermediate retainer mentioned above has the securing portion on the outer cylinder, and the outer cylinder has the complicated configuration, machining operations are required to form the complicated configuration, and man-hour requirement increases. Accordingly, a rise in the manufacturing cost has resulted.

SUMMARY OF THE INVENTION

It is an object of the present invention to provide a hose intermediate retainer which does not require processes of machining operations to manufacture the hose intermediate retainer.

It is another object of the present invention to to provide a hose intermediate retainer which can offer a larger contacting area between the outer cylinder and the clamp, and exhibit a superior tensile strength.

A hose intermediate retainer according to the present invention comprises an inner cylinder placed in a hose and an outer cylinder covering the hose at a location corresponding to the location of said inner cylinder and being pressed in the radial direction inwardly for holding the hose between itself and said inner cylinder, and a clamp secured to the outside of the outer cylinder.

The outer cylinder comprises a first pressed portion having a smooth surface pressed circularly in the radial direction inwardly except both ends thereof, and at least one second pressed portion formed on the portion of the first pressed portion and depressing the outer surface of the hose by the inner periphery surface thereof.

The clamp covers the first pressed portion, and the axial movement thereof is restricted and secured by both ends portion of the outer cylinder which are not pressed and have a larger diameter than that of the first pressed portion.

The hose intermediate retainer according to the present invention comprises a hose, an inner cylinder and an outer cylinder, and a clamp.

The hose is same as a conventional hose formed of elastic substances, such as rubbers and resins. It is held between the inner cylinder and the outer cylinder by the elastic repulsion force corresponding to the compressive stress exerted by the outer cylinder.

The inner cylinder is generally formed of a metal. It has an outer diameter approximately equal to or somewhat larger than the inside diameter of the hose. It is placed at a predetermined portion inside the intermediate portion of the hose. It is preferred to make the length of the inner cylinder at least equal to the length of the outer cylinder portion to be pressed. It is also preferred to make the inside diameter of the inner cylinder as large as possible, so that the inner cylinder does not prevent a fluid in the hose from flowing. However, if the thickness of the inner cylinder wall is excessively thin, the inner cylinder might be deformed when the outer cylinder is pressed. Therefore, precautions should be taken not to make the thickness of the inner cylinder wall too thin. In addition, the outer periphery surface of the inner cylinder may be roughed in order to increase a force joining the inner cylinder and the hose together.

The best feature of the present invention is the configuration of the outer cylinder. The outer cylinder comprises a first pressed portion having a smooth surface pressed circularly in the radial direction inwardly except both ends thereof, and at least one second pressed portion formed on the portion of the first pressed portion and depressing the outer surface of the hose by the inner periphery surface thereof.

The first pressed portion has a decreased outer diameter except its both ends. Accordingly, the clamp exhibits a satisfactory retaining force when the first pressed portion is gripped by the clamp. The both ends of the first pressed portion extend like a flange. Accordingly, the disengagement of the clamp and the outer cylinder can surely be prevented because the axial movement of the clamp is restricted by the both ends of the outer cylinder. The first pressed portion can be formed by pressing the outer surface of the outer cylinder in the radial direction inwardly with circularly crimping dies.

Small non-pressed portions might arise in the first pressed portion depending on configurations of the circularly crimping dies, however, the non-pressed portions do not adversely affect the retaining force of the clamp because the height of the non-pressed portions is as low as 1 mm or less, and the length of the non-pressed portions in the axial direction is same as that of the first pressed portion.

The second pressed portion is formed on the portion of the first pressed portion. The second pressed portion is a groove-shape, and the surface of the second pressed portion located at the inside of the outer cylinder, extends from the inner periphery surface of the outer cylinder, and depresses the outer surface of the hose. The second pressed portion secures the tensile strength between the intermediate retainer and the hose.

A plurality of the second pressed portions may be spaced in line in the circumferential direction of the outer cylinder, and formed in a ring-shaped groove extending in the circumferential direction of the outer cylinder. A plurality of the second pressed portions may be disposed in the axial direction of the outer cylinder. However, the surface area of the first pressed portion decreases as the number of the second pressed portions increases, consequently, the retaining force of the clamp decreases. Therefore, it is preferred to limit the number of the second pressed portions to a number by which a satisfactory tensile strength can be secured.

The second pressed portion can be formed by the conventional hexagonal or octagonal crimping. For instance, the second pressed portion can be formed by the octagonal crimping after the inner cylinder and outer cylinder have been placed at their predetermined positions and the first pressed portion has been formed by the circular crimping. In this case, however, the first pressed portion might be deformed and the smoothness may be damaged when forming the second pressed portion. To avoid the problem, the second pressed portion may be formed first, and then the first pressed portion may be formed contrary to the process mentioned above. In addition, it is preferred to form the first and the second pressed portion by one crimping operation simultaneously. Thus one crimping operation may by avoided, and the man-hour requirement will be reduced, and the smoothness of the outer cylinder will not be damaged.

For the clamp, the conventional clamp having a cylindrical gripping portion at one end and a mounting portion, which enables the mounting of the clamp to the body of an automobile, at the other end may be used as it is. The outer cylinder, the hose, the inner cylinder and the clamp are fixed integrally by gripping the first pressed portion with the gripping portion.

Advantages of the Present Invention

In a fixing construction for a hose intermediate retainer according to the present invention, the outer cylinder has the first pressed portion having a smooth surface pressed circularly in the radial direction inwardly except both ends thereof, and at least one second pressed portion formed on the portion of said first pressed portion and depressing the outer surface of the hose by the inner periphery surface thereof. Accordingly, the clamp secured to the first pressed portion exhibits a satisfactory retaining force. In addition, the relative movement of the clamp and the outer cylinder is avoided because the axial movement of the clamp is restricted by the both ends of the first pressed portion.

Further, a high tensile strength is maintained because the outer cylinder is firmly secured by the second pressed portion.

In accordance with the hose intermediate retainer of the present invention, the outer cylinder can be formed easily without machining operations, hence the manufacturing cost can be reduced. Furthermore, the clamp exhibits a firm retaining force, and the tensile strength of the hose intermediate retainer becomes excellent without using an adhesive.

BRIEF DESCRIPTION OF THE DRAWINGS

Other objects and advantages of the invention will be apparent from the following description, the appending claims and the accompanying drawing, in which.

DESCRIPTION OF THE PREFERRED EMBODIMENTS

A hose intermediate retainer according to the present invention will be hereinafter explained with reference to preferred embodiments.

First preferred Embodiment

Figure 1:
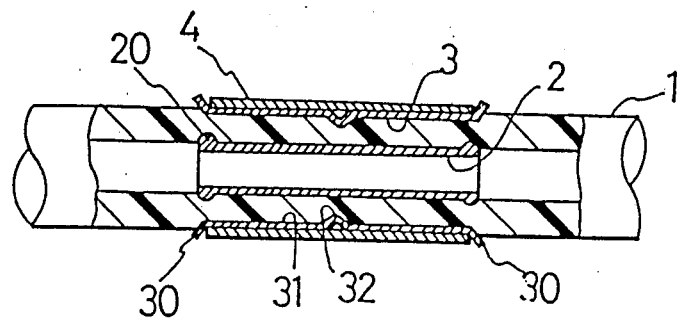
FIG. 1 shows major sections of a preferred embodiment of a hose intermediate retainer according to the present invention.

FIG. 1 shows a preferred embodiment of a hose intermediate retainer according to the present invention. A first preferred embodiment of a hose intermediate retainer according to the present invention comprises the following:

a hose 1, an inner cylinder 2 placed in the hose 1, an outer cylinder 3 covering the hose 1 at a location corresponding to the location of the inner cylinder 2 and being pressed in the radial direction inwardly for holding the hose 1 between itself and the inner cylinder 2, and a clamp 4 secured to the outside of the outer cylinder 3.

Further, the outer cylinder 3 comprises the following:

a first pressed portion 31 having a smooth surface pressed circularly in the radial direction inwardly except both ends thereof, and aplurality of second pressed portions 32 spaced in line in the circumferential direction of the outer cylinder 3 at the middle of the first pressed portion 31.

Furthermore, the clamp 4 covers the first pressed portion 31, and the axial movement of the clamp 4 is restricted and ssecured by the both ends 30 of outer cylinder 3.

Non-pressed portions, like a streak extending in the axial direction, with a height of 1 mm or less were formed on the first pressed portion 31. But they did not adversely affect the retaining force of the clamp 4.

The making method of the hose intermediate retainer mentioned above will be hereinafter explained.

The inner cylinder 2 is inserted into the center hole of the hose 1 by pressing it with a suitable jig to a predetermined location. In this preferred embodiment, projections 20 having a diameter larger than the diameter of the inner cylinder 2 are formed at the both ends of the inner cylinder 2 to avoid the inner cylinder coming-off and increase a force joining the hose 1 and the inner cylinder 2.

Then a tubular body to be the outer cylinder 3 covers the outer surface of the hose 1 at the location corresponding to the inner cylinder 2.

And the outer surface of the tubular body is crimped hexagonally by crimping dies to form the second pressed portion 32.

And then the outer surface of the tubular body is crimped circularly by circular crimping dies having a lenght slightly shorter than the tubular body on which the second pressed portion 32 is formed. Thus the first pressed portion 31 is formed on the tubular body outer surface excepting the portions 30 at both ends.

Further, the first pressed portion 31 is gripped by the clamp 4. Thus the hose intermediate retainer comprising the hose 1, inner cylinder 2, outer cylinder 3 and clamp 4 has been formed.

The obtained hose intermediate retainer had the tensile strength enduring a load of 150 to 200 kg.

Figure 6:
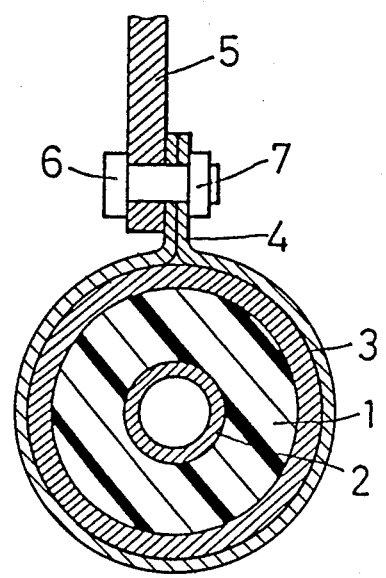
FIG. 6 shows how a hose intermediate retainer according to the present invention is fixed to an automobile body.

As shown in FIG. 6, the hose intermediate retainer of the first preferred embodiment is fixed to an automobile body 5 by a bolt 6 and a nut 7.

Second preferred Embodiment

Figure 2:
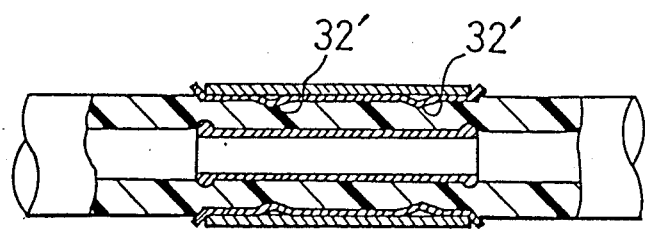
FIG. 2 shows major sections of another preferred embodiment of a hose intermediate retainer according to the present invention.
Figure 3:
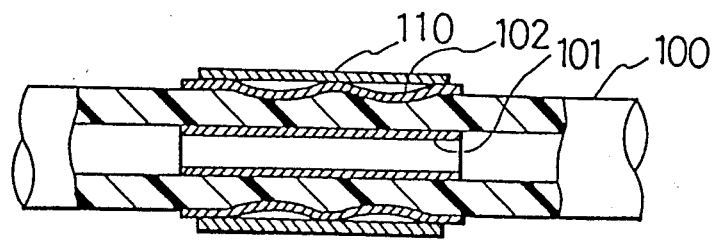
FIG. 3 shows major sections of a conventional hose intermediate retainer.
Figure 4:
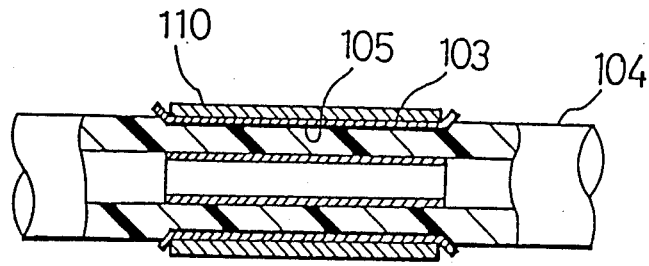
FIG. 4 shows major sections of another conventional hose intermediate retainer.
Figure 5:
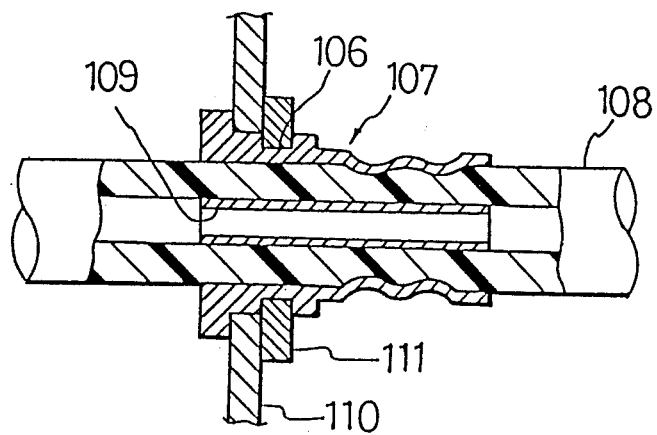
FIG. 5 shows major sections of still another conventional hose intermediate retainer.

FIG. 2 shows major sections of a second preferred embodiment of a hose intermediate retainer according to the present invention. The hose intermediate retainer of the second preferred embodiment is same as that of the first preferred embodiment except that two lines of the second pressed portions 32' are disposed in the axial direction.

In the hose intermediate retainer of the second preferred embodiment, the clamp exhibits the retaining force slightly less than that of the clamp in the first preferred embodiment, but the construction of the second preferred embodiment had the tensile strength enduring a load of approximately 250 kg.

The hose intermediate retainer of the second preferred embodiment is also fixed to an automobile body 5 by a bolt 6 and a nut 7 in the same manner as shown in FIG. 6.

What is claimed is:

1. A hose intermediate retainer comprising:

a hose;

an intermediate retainer having: an inner cylinder placed in said hose; and an outer cylinder covering said hose at a location corresponding to the location of said inner cylinder and being pressed in the radial direction inwardly for holding said hose between itself and said inner cyliinder; and a clamp secured to the outside of said outer cylinder;

wherein said outer cylinder comprises: a first pressed portion having a smooth surface pressed circularly in the radial direction inwardly except both ends of said outer cylinder; and at least one second pressed portion formed on the portion of said first pressed portion for depressing the outer surface of said hose;

said inner cylinder has a ring shaped projection at both ends having an outside diameter larger than the outside diameter of the central portion thereof; and said clamp is secured around said first pressed portion of said outer cylinder and the axial movement of said clamp is restricted by said both ends of said outer cylinder.

2. A hose intermediate retainer according to claim 1, wherein the outer periphery surface of said inner cylinder has a roughed surface.

3. A hose intermediate retainer according to claim 1, wherein said second pressed portion is a ring-shaped groove extending in the circumference direction of said outer cylinder.

* * * * *

UNITED STATES PATENT AND TRADEMARK OFFICE
CERTIFICATE OF CORRECTION

PATENT NO. : 4,840,408

DATED : June 20, 1989

INVENTOR(S) : NISHIKI, et al.

It is certified that error appears in the above-identified patent and that said Letters Patent is hereby corrected as shown below:

Col. 2, line 3, change "invention to to" to -- invention to --.

Col. 3, line 12, delete the "," after "cylinder".

Col. 4, line 58, change "aplurality" to -- a plurality --;

line 63, change "ssecured" to -- secured --;

line 68, change "adverserly" to -- adversely --.

Signed and Sealed this

Tenth Day of September, 1991

Attest:

HARRY F. MANBECK, JR.

Attesting Officer      Commissioner of Patents and Trademarks